UNITED STATES PATENT OFFICE.

HENRY A. GARDNER, OF WASHINGTON, DISTRICT OF COLUMBIA.

VEHICLE FOR PAINTS AND THE LIKE AND PROCESS OF MAKING THE SAME.

1,370,106.     Specification of Letters Patent.     Patented Mar. 1, 1921.

No Drawing.     Application filed August 12, 1919. Serial No. 317,010.

*To all whom it may concern:*

Be it known that I, HENRY A. GARDNER, a citizen of the United States, residing at Washington, in the District of Columbia, have invented certain new and useful Improvements in Vehicles for Paints and the like and Processes of Making the Same, of which the following is a specification.

This invention relates to vehicles for paints and the like, one of the objects of the invention being to produce economically a relatively non-volatile drying oil from cheaper volatile oils.

I have discovered that by effective polymerization of turpentine, pine-oil or the like, under certain conditions, an efficient drying oil can be produced which is suitable to replace linseed oil or the other more expensive vehicles commonly used. The polymerization is preferably effected with concentrated sulfuric acid.

The following example illustrates the manner in which the method is preferably carried out, but it is to be understood that I do not intend to limit myself to the precise proportions, temperature and acid concentration therein stated, nor to the particular manipulative steps, although within certain limits the conditions given are necessary to the desired end.

400 parts by weight of turpentine, pine-oil, or similar distillation products of coniferous trees are placed in an acid-resisting vessel, preferably provided with suitable coils through which cold water may be passed in order to regulate the temperature of reaction, and about 20 to 30 parts by weight of concentrated sulfuric acid, say 92%, is gradually added. By means of the water-coil the temperature is preferably maintained at approximately 80° C., although much higher temperatures may be used provided a reflux condenser is employed. I do not as a rule, however, employ temperatures in excess of 160° C., the boiling point of turpentine, as loss by evaporation may then occur.

When the temperature of the liquid begins to fall rapidly, indicating completion of reaction, about an equal volume of water is added for washing. The liquid thereupon separates into two layers. The water with its dissolved sulfuric acid, which comprises one of these layers, is siphoned off or otherwise withdrawn, and another volume of water is added for washing purposes. If desired a slight amount of sodium carbonate may be added for neutralization. The amber or reddish heavy liquid floating on top of the water is removed and warmed to drive off moisture. It is then ready for use.

To this oil I usually add 5% of drier, as is the case with linseed oil, and grind with pigments in the usual manner to form paints. If it is to be used for varnish purposes, the pigments may of course be omitted.

As a rule I find that the above amount of acid is sufficient. A larger quantity of slightly weaker acid or a smaller quantity of fuming acid (containing $SO_3$) may be used if desired. In this case a final product is secured which has a higher proportion of non-volatile matter.

Pure turpentine of commerce has approximately the following constants:

When applied to a surface it evaporates in a few minutes without leaving any residue.

Color, water white;
Specific gravity, 0.86;
Boiling point, 160° centigrade (90% distilling below 170° C.)

When turpentine is polymerized according to my process, using 92% sulfuric acid, a product results which contains but a relatively small proportion, if any, of volatile matter, and which, like linseed oil, does not evaporate but dries when applied to a surface, through the absorption of oxygen or by other processes to a firm, durable, thick film. The following constants of this polymerized turpentine are quite different, it will be observed, from the original turpentine:

Color, straw to red;
Specific gravity, .90;
Initial boiling point, 185–220° C.;
Non-volatile content above 220°—40–50%.

When 98% sulfuric acid is used a product having the following constants has been obtained:

Color, straw to red;
Specific gravity, .92;
Initial boiling point, 200° C.;
Non-volatile content above 320° C.—60%.

Pine-oil, which may be treated by the same process, has before polymerization the following constants:

Color, white to straw;
Specific gravity, .88;
Boiling point, 180 to 200° C.;
All volatile below 240° C.

One polymerization product of pine oil showed the following constants:

Color, straw to red;
Specific gravity, .95;
Boiling point, 220° C.;
Non-volatile content above 320° C.—50%.

By continuing the process of polymerization, for instance using a reflux condenser and controlling the temperature and amount of acid, I may polymerize the turpentine to such an extent that it is practically all non-volatile.

The products of the above examples generally have an iodin number of from 100 to 120 and a saponification number of from 15 to 20. Without thorough washing they may show an acid value of from 6 to 8, although they may be made thoroughly neutral by the use of sodium carbonate or the like during the washing step.

I am aware that turpentine has been polymerized to a heavy gum or resin suitable as a substitute for rubber. Such process however, produces a material unfit for the present intended purpose. I believe that I am the first to discover that by effecting polymerization of turpentine, or the heavier grade known as pine oil, under certain conditions an oil is produced which is suitable to replace linseed oil for paint vehicles.

Where I have used the word "turpentine" in the claims, it is to be understood that I thereby intend to include the other simple distillation products of coniferous trees, such as pine oil.

I claim:

1. The process of producing liquid, non-resinous and substantially non-volatile oils suitable for paint-vehicles from turpentine and the like, which comprises polymerizing the turpentine with sulfuric acid substantially equivalent to acid of 92% concentration in proportion not exceeding 7.5% by weight of the turpentine, and recovering the polymerized oil from the reaction products.

2. The process of producing liquid, non-resinous and substantially non-volatile oils suitable for paint-vehicles from turpentine, which comprises polymerizing the turpentine with from 5 to 7.5 per cent. by weight of sulfuric acid of substantially 92 per cent. cencentration, and recovering the polymerized oil from the reaction products.

3. The process of producing liquid, non-resinous and substantially non-volatile oils suitable for paint-vehicles from turpentine, which comprises polymerizing the turpentine with from 5 to 7.5 per cent. by weight of sulfuric acid of substantially 92 per cent. concentration, washing the liquid reaction products with a substantially equal volume of water, recovering the oily product from said reaction products, and removing the moisture therefrom.

4. A non-resinous oil suitable for use as a paint-vehicle, comprising a fluent liquid product of polymerization of turpentine, drying when spread in a thin layer to a firm, tough film.

5. A non-resinous oil suitable for use as a paint-vehicle, comprising a liquid product of polymerization of turpentine, of a specific gravity 0.9 to 0.95, straw to red in color, and having an initial boiling-point of from 180 to 220° C.

6. A non-resinous oil suitable for use as a paint-vehicle, comprising the liquid product of polymerization of turpentine with from 5 to 7.5 per cent. by weight of sulfuric acid of substantially 92 per cent. concentration.

7. A paint containing a pigment and a non-resinous drying oil, said oil being a liquid product of polymerization of turpentine.

In testimony whereof I affix my signature.

HENRY A. GARDNER.